United States Patent
Sevola

(10) Patent No.: US 6,675,936 B2
(45) Date of Patent: Jan. 13, 2004

(54) LUBRICANT DISCHARGE DEVICE

(75) Inventor: Mauri Sevola, Vaasa (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/386,931

(22) Filed: Mar. 13, 2003

(65) Prior Publication Data

US 2003/0173158 A1 Sep. 18, 2003

Related U.S. Application Data

(63) Continuation of application No. PCT/FI01/00804, filed on Sep. 17, 2001.

(30) Foreign Application Priority Data

Sep. 18, 2000 (FI) .............................................. 20002059

(51) Int. Cl.$^7$ .............................................. F16N 33/00
(52) U.S. Cl. ...................... 184/1.5; 184/105.1; 141/65
(58) Field of Search ....................... 184/1.5, 5.1, 105.1, 184/105.2, 105.3; 384/462, 471; 222/256; 141/7, 59, 65

(56) References Cited

U.S. PATENT DOCUMENTS

| | | | | |
|---|---|---|---|---|
| 136,264 A | * | 2/1873 | Randall | ........................ 141/59 |
| 2,548,644 A | * | 4/1951 | Wightman | ................... 384/466 |
| 3,804,476 A | | 4/1974 | Nakamura et al. | |
| 3,833,276 A | * | 9/1974 | Baumann et al. | ........... 384/466 |
| 4,548,088 A | * | 10/1985 | Hood, Jr. | ...................... 184/1.5 |
| 4,854,748 A | | 8/1989 | Gabelli et al. | |
| 4,905,643 A | * | 3/1990 | DeGrazia, Jr. | ............... 184/106 |
| 4,954,748 A | | 9/1990 | Weatherup | |
| 4,977,978 A | * | 12/1990 | Batrice | ......................... 184/1.5 |
| 5,077,503 A | | 12/1991 | Tamura et al. | |
| 6,244,389 B1 | * | 6/2001 | Wilcox | ..................... 184/105.3 |

OTHER PUBLICATIONS

Patent Abstracts of Japan, vol. 11, No. 6 M–551, of JP 61–184299, dated Aug. 16, 1986, entitled "Waste Grease Discharge Device of Bearing".
Patent Abstracts of Japan, abstract of JP 8–200379, entitled "Bearing Device".

* cited by examiner

*Primary Examiner*—David A. Bucci
*Assistant Examiner*—Timothy McAnulty
(74) *Attorney, Agent, or Firm*—Dykema Gossett PLLC

(57) ABSTRACT

A lubricant discharge device for discharging lubricant from a bearing housing (1) of an electric motor includes a tubular element (3) consisting of components (3a, 3b) arranged at a lubricant discharge opening (2) in the bearing housing. A piston (4) is arranged inside the tubular element (3) being connected to an arm section (5). The tubular element comprises a first end (3d) placed at the grease discharge opening and a second end (3c) that is opposite to the first end and is situated at the outer edge of an end shield of the electric motor. An opening (6) is provided in the casing of the tubular element close to the second end (3c) of the tubular element, and a closing means (7) is arranged inside the tubular element to open and close the opening (6).

11 Claims, 4 Drawing Sheets

LUBRICANT DISCHARGE DEVICE

This application is a Continuation of International Application PCT/FI01/00804 filed on Sep. 17, 2001, which designated the U.S. and was published under PCT Article 21(2) in English.

FIELD OF THE INVENTION

The invention relates to a lubricant discharge device for controlled removal of lubricant from a bearing housing of an electric motor. Such a device typically comprises a cylinder arranged in close connection with a lubricant discharge opening situated in an end shield or a bearing cap of the electric motor. The lubricant that has flowed into the cylinder is discharged by means of a piston provided in the cylinder.

BACKGROUND OF THE INVENTION

An axle in an electric motor is typically supported on the motor frame by at least two main bearings, which are usually located at each end of the motor frame. Lubricant is used to lubricate the bearings. For conducting the lubricant to the bearing, the frame of the electric motor is usually provided with a bearing housing placed in an end shield forming the end piece of the motor frame, to receive the lubricant conducted thereto via a lubricant conduit. The end of the lubricant conduit comprises a grease nipple, through which the lubricant is pressed into the lubricant conduit. The end shield is also provided with a lubricant discharge opening, via which the excess lubricant is able to leave the bearing housing. This lubricant discharge opening is closed by means of different closing means, such as a screw inserted into the opening, a plastic plug pressed into the opening, or a grease receiver placed at the mouth of the opening. In the most advanced arrangement a cylindrical lubricant discharge device is tightly arranged at the mouth of the discharge opening in the end shield or the bearing cap of the electric motor, and the cylinder of the device comprises a piston arranged inside the cylinder to draw out of there the lubricant that has flowed into the cylinder.

Controlled removal of extra lubricant from a bearing housing of an electric motor is particularly important in surroundings requiring a high level of purity, such as in food industry. It is important to prevent the lubricant from splashing to the surroundings via the lubricant discharge opening or via bearing packings of the motor axle. Also environmental protection regulations, which are becoming stricter and stricter, require that any leaking of lubricant to pollute the surroundings be prevented. Furthermore, it is important that the motor is leak-proof, i.e. it comprises no apertures that could easily remain open for example after maintenance, thus allowing dust and moisture into the bearing housing to possibly damage the bearing and the motor. Moreover, the enclosure class of the motor decreases if the motor frame comprises open apertures.

Such a prior art lubricant discharge device comprises a cylinder or a pipe arranged at the mouth of a lubricant discharge opening in an end shield or a bearing cap of an electric motor parallel to the surface thereof. The cylinder is tightly closed at the and near the lubricant discharge opening in the end shield. An openable plug protects the other end of the pipe, which is typically located at the edge of the end shield in the electric motor. Inside the pipe there is a piston that is moved by a rod-like arm connected to the piston. The device operates such that during inaction the piston is inserted into the closed pipe end so that additional lubricant flowing from the bearing housing of the motor to the cylinder is able to drain away to the side of the piston near the openable cylinder end, i.e. to the front of the piston. When the additional lubricant that has flowed into the cylinder is to be removed therefrom, a plug situated at the openable end of the cylinder is opened and the piston is pulled out of the cylinder by an arm provided inside the cylinder and connected to the piston. The piston thus draws the lubricant with it, and the lubricant is then discharged via the open end of the cylinder and recovered.

However, the prior art lubricant discharge device disclosed above has problems that complicate controlled removal of lubricant. In the device, the lubricant that has gathered in the cylinder is discharged by pulling the piston out of the cylinder, so that the lubricant is released via the open cylinder end. Such an arrangement always requires the use of additional tools to recover the lubricant, since a large amount of the discharged lubricant adheres to the piston and must be scraped off. Furthermore, in the arrangement the cylinder head becomes dirty and must be cleaned by additional methods. The device also comprises several unconnected components, which might be lost or damaged, and the motor may thus become less leak-proof if for example the plug intended for the cylinder end is not reinstalled after the removal of the lubricant.

The prior art arrangement is thus difficult to use and therefore causes a risk of pollution to the environment of the motor. Also, when properly carried out, maintenance requires unnecessary stages of operation and a great deal of wasted time and also creates extra costs.

BRIEF DESCRIPTION OF THE INVENTION

An objective of the present invention is to eliminate prior art drawbacks and to provide an improved arrangement for a lubricant discharge device of an electric motor.

This is achieved by an arrangement characterized by what is disclosed in the claims of the present invention. More precisely, the arrangement according to the invention is characterized in that the lubricant discharge device comprises a tubular element arranged closely at a lubricant discharge opening in a bearing housing of an electric motor, the element comprising a first end located substantially at the grease discharge opening of the bearing housing of the electric motor, and an opposite, second end situated substantially at the outer edge of an end shield in the electric motor. An opening is provided in the casing of the tubular element substantially close to the second end of the tubular element, and a closing means, such as a slide, is arranged inside the tubular element at the opening to open and close the opening. This closing means is arranged to open and close the opening such that the closing means moves a certain distance inside the tubular element. The aforementioned opening in the outer casing of the tubular element thus acts as a lubricant discharge opening to discharge the lubricant gathered inside the tubular element.

The preferred embodiments of the invention are disclosed in the dependent claims.

The tubular element is preferably a round cylinder. The tubular element can naturally also be triangular, quadrangular or the like. However, the shape of the closing means always corresponds to the shape of the tubular element. For the sake of simplicity, the tubular element will be hereinafter referred to as a cylinder regardless of its actual shape.

The outer circumference of the closing means approximately equals the inner circumference of the cylinder. The outer circumference of the closing means and the inner circumference of the cylinder casing thus form together a sealing in the area where they connect, when the clearance at the connecting surface is designed to be sufficiently small. At the edge near the piston, the outer surface of the closing means can preferably also comprise a groove, which is provided with a seal, such as an O ring, a metal ring or some other corresponding traction seal. A sealing is thus formed at the connecting surface between the closing means and the cylinder's inner casing to prevent the lubricant from leaking uncontrollably out of the space reserved for it in the cylinder to pollute the environment.

Substantially in the middle of its diameter, the closing means comprises a through hole for inserting the arm section of the piston, arranged in the longitudinal direction of the closing means and equalling in size the diameter of the arm section. Thus, the piston is preferably able to move in the cylinder without the closing means restricting the piston movement outside the cylinder end near the closing means.

The outer surface of the closing means comprises a groove provided with a stop element, such as a locking ring, and the inner surface of the cylinder in turn comprises a groove arranged to receive the stop element. The stop element is thus arranged to fasten the closing means in place inside the tubular element. The width of the groove provided on the outer surface of the closing means is designed so that the groove allows the closing means to move a sufficient distance in the cylinder in order to open and close the lubricant discharge opening located near the cylinder end at the outer edge of the end shield in the electric motor. The closing means is thus able to move a distance equalling the groove width in the cylinder, restricted by the stop element, thus opening and closing the lubricant discharge opening.

The groove provided in the closing means can also comprise a spring element, the tension of which automatically closes the opening by moving the closing means thereto.

At the outer edge of the end shield in the electric motor, i.e. at the end of the piston arm opposite to the piston, the other end of the lubricant discharge device comprises a closing element consisting of a head and a thread. The thread is to be inserted into the cylinder and the head is intended to remain outside the opening provided at the end of the cylinder. When the closing element is inserted in place, the length of the thread of the closing element is preferably designed to push the closing means so as to close the lubricant discharge opening in the cylinder casing. An advantage is that the lubricant discharge opening closes whenever the closing element is properly inserted in place.

The opening situated in the outer casing of the cylinder can be preferably provided with a nipple or a pipe fitting, which in turn can be connected to a lubricant receiver, such as a box, a bag, a pipe or the like, for the duration of the discharge of lubricant. The arrangement according to the invention thus enables improved control of the lubricant discharge. Therefore lubricant can be discharged from the bearing housing and the cylinder so that no lubricant leaks to the environment, but all the lubricant can be efficiently collected to the lubricant receiver. This prevents the motor from getting dirty and the lubricant from splashing uncontrollably to the surroundings of the motor, while ensuring proper lubrication of the bearing. Furthermore, the sealing of the motor thus always corresponds to the requirements, for example the IP66 enclosure class, since the closing means can always be inserted in place in a simple manner.

BRIEF DESCRIPTION OF THE FIGURES

In the following, the invention will be described in more detail with reference to the accompanying drawings, in which.

DESCRIPTION OF THE PREFERRED EMBODIMENT

FIGS. 1 to 11 illustrate an example of the structure and operation of a lubricant discharge device according to a typical preferred embodiment.

Figure 1:
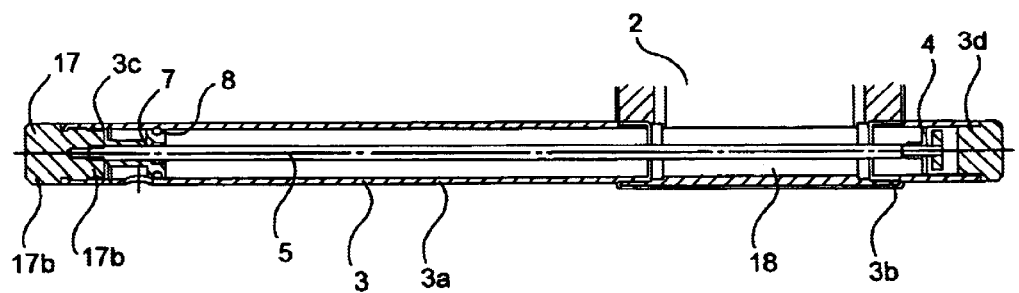
FIG. 1 shows a lubricant discharge device according to an embodiment of the invention.
Figure 6:
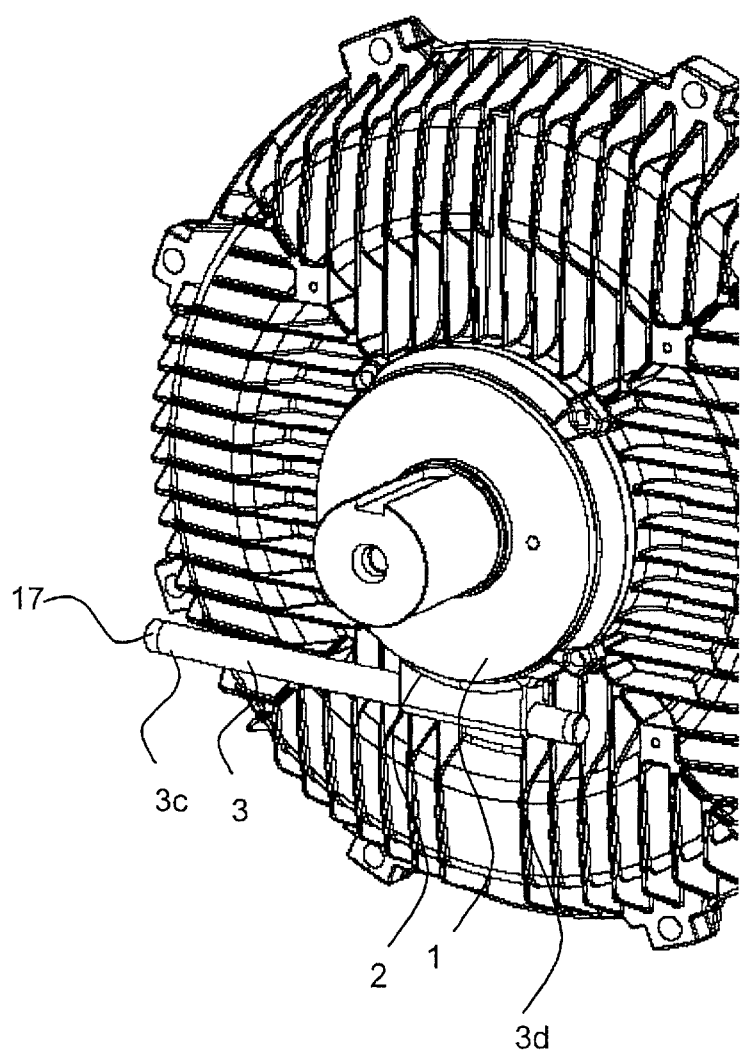
FIG. 6 is an axonometric view of an end shield in an electric motor, provided with a lubricant discharge device as shown in FIG. 1.

As shown in FIGS. 1 and 6, a lubricant discharge device comprises a tubular element 3 consisting of one or more components 3a, 3b and arranged tightly at a lubricant discharge opening 2 in a bearing housing 1 of an electric motor. The tubular element 3 is preferably a round cylinder. The tubular element 3 can also be triangular, quadrangular or the like. The shape of the tubular element 3 and the number of the components is dependent on the shape of the lubricant discharge opening 2 in the electric motor. For the sake of simplicity, the tubular element 3 will be hereinafter referred to as a cylinder 3 regardless of its actual shape.

Both ends 3c, 3d of the cylinder 3 can be tightly closed for example by a closing element, such as a plug. The end 3d of the cylinder 3 located at the lubricant discharge opening 2 of the motor is tightly closed by a plug. The opposite end 3c of the cylinder 3 can be opened, and the closing element 17 shown in FIG. 3, attached to the end 3c, consists of a head 17b and a thread 17a. The thread 17a is to be inserted into the cylinder 3 to fasten the closing element 17 thereto. The head 17b is intended to remain outside the opening provided at the end 3c of the cylinder 3.

An arm section 5 is connected from its first end to the closing element 17, and the second end of the arm section is provided with a piston 4. The piston 4 is arranged inside the cylinder 3, and these components constitute the primary operating elements in the lubricant discharge device.

Near the end 3c of the cylinder 3, the outer casing of the cylinder 3 comprises an opening, and a closing means 7, typically a slide, is arranged inside the cylinder 3 at the opening 6. This closing means 7 is arranged to open and close the opening 6. The opening 6 is used as a lubricant discharge opening to discharge the lubricant that has gathered inside the cylinder. The closing means 7 is arranged to move a certain distance inside the cylinder 3.

Figure 2:
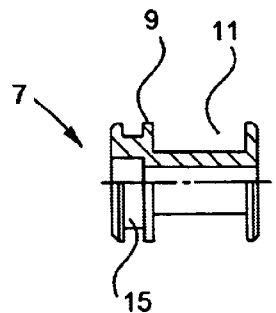
FIG. 2 shows a closing means in the lubricant discharge device of FIG. 1.
Figure 3:
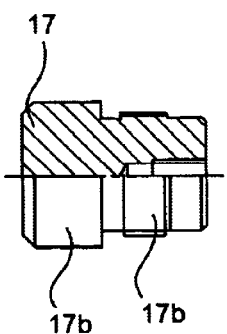
FIG. 3 shows a closing element attached to the end of a piston arm in the lubricant discharge device of FIG. 1, FIG. 4 stows the end of the lubricant discharge device of FIG. 1 close to a slide.
Figure 4:
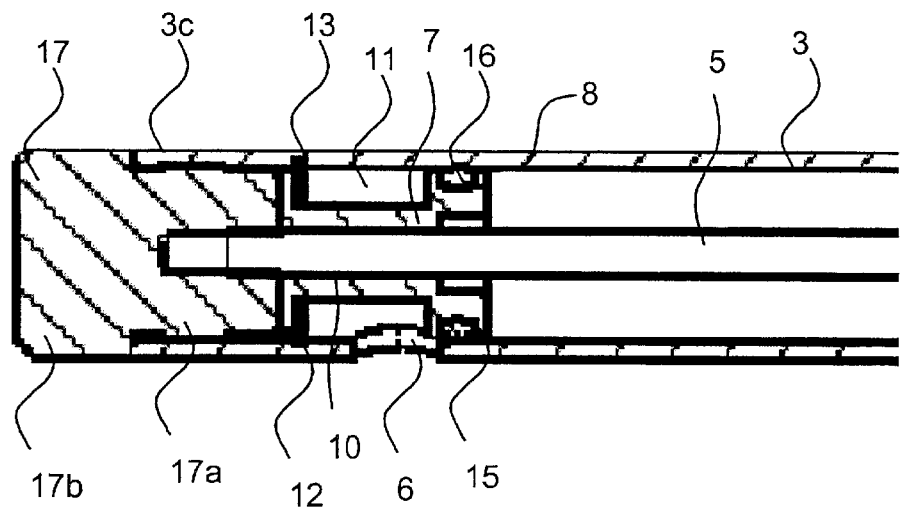
Figure 5:
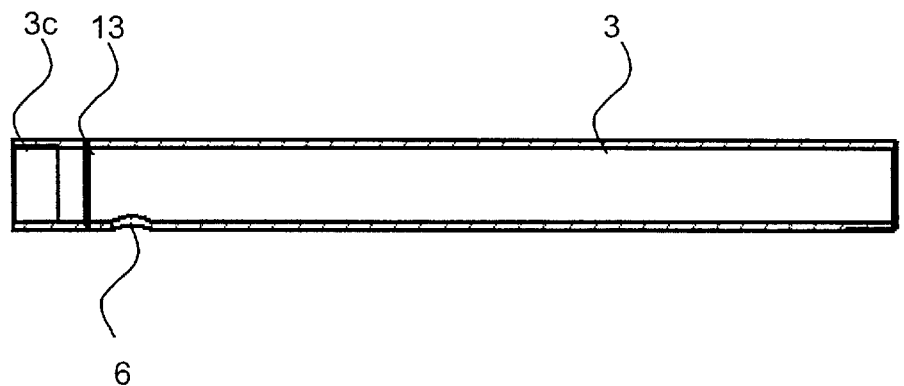
FIG. 5 shows a tubular element in the lubricant discharge device of FIG. 1.

The structure of the closing means is shown in more detail in FIG. 2. The shape of the closing means 7 always corresponds to the shape of the cylinder 3. The outer circumference 9 of the closing means 7 approximately equals the inner circumference 8 of the cylinder. The outer circumference 9 of the closing means 7 and the inner circumference 8 of the cylinder casing thus form a sealing at their connecting surface when the clearance at the surface is sufficiently small. At the edge of the closing means 7 near the piston, the outer surface 9 of the closing means 7 can preferably also comprise a groove 15, which is provided with a seal 16, such as an O ring, a metal ring or some other corresponding traction seal. A sealing is thus formed at the connecting surface between the outer circumference 9 of the closing means 7 and the inner casing 8 of the cylinder 3, and lubricant cannot thus leak uncontrollably out of the space reserved for it in the cylinder 3.

Substantially in the middle of its diameter, the closing means 7 comprises a through hole 10 for inserting the arts section 5 of the piston 4, arranged in the longitudinal direction of the closing means 7 and approximately equalling in size the diameter of the arm section 5. The piston 4 is thus able to move inside the cylinder without the closing means 7 restricting the piston 4 movement outside the cylinder 3 end near the closing means 7.

The outer surface of the closing means 7 comprises a groove 11 provided with a stop element 12, such as a locking ring. The inner surface of the cylinder 3 correspondingly comprises a groove 13 arranged to receive the stop element 12. The stop element 12 is thus movably arranged to fasten the closing means 7 inside the cylinder 3. The width of the groove 11 provided on the outer surface of the closing means 7 is designed so as to allow the closing means 7 to move a sufficient distance inside the cylinder 3 in order to open and close the lubricant discharge opening 6 provided near the open end of the cylinder. The closing means 7 is thus able to move a distance equalling the groove 11 width in the cylinder, restricted by the stop element 12, and thus to open and close the lubricant discharge opening 6. The width of the groove 11 provided on the outer surface of the closing means 7 equals the diameter of the opening near the open end 3c of the tubular element 3, combined with the thickness of the stop element 12 and the piston 4. The closing means 7, which is restricted by the stop element 12, thus moves to open and close the opening 6.

Figure 11:
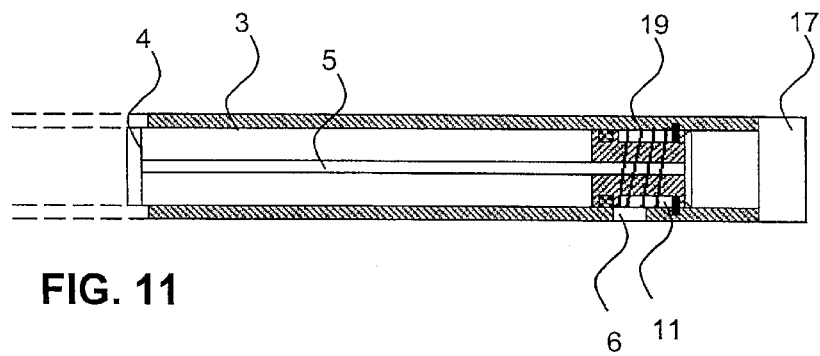
FIG. 11 shows the lubricant discharge device of FIG. 1 when the spring element of the closing means is inserted in place.

As shown in FIG. 11, the groove 11 can also be provided with a spring element 19, the tension of which automatically closes the opening 6 by moving the closing means 7 thereto.

Figure 10:
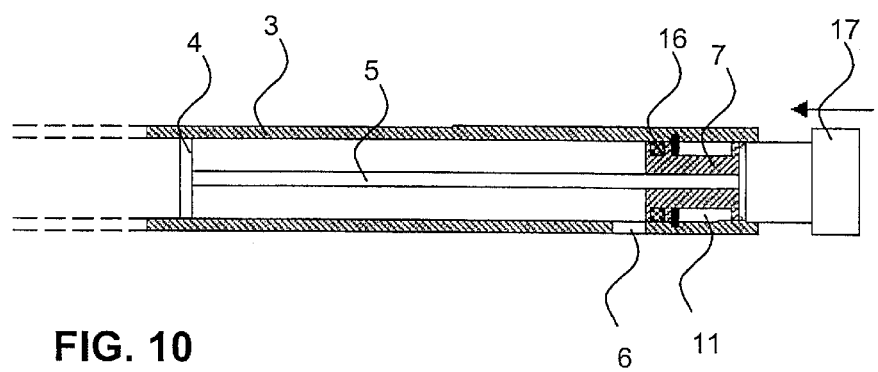
FIG. 10 shows the lubricant discharge device of FIG. 1 when the closing element is being inserted in place and it pushes the closing means to close the lubricant discharge opening.

As shown in FIGS. 1, 10 and 11, when the closing element 17 is inserted in place, the length of its thread 17a is designed to push the closing element 17 so as to close the lubricant discharge opening 6 in the cylinder 3 casing. The lubricant discharge opening 6 is thus always closed when the closing element 17 is property installed. The sealing of the electric motor thus always corresponds to the requirements, for example the IP66 enclosure class. Furthermore, the position of the closing element 17, i.e. the protrusion with respect to the cylinder end, functions as a signal indicating whether the lubricant discharge opening 6 is open or closed.

The lubricant discharge opening 6 can be provided with a nipple or a pipe fitting, which in turn can be connected to a lubricant receiver, such as a box, a bag, a pipe or the like, for the duration of the discharge of lubricant. The lubricant can thus be discharged from the bearing housing and the cylinder so that no lubricant leaks to the environment, but all the lubricant can be efficiently collected to the lubricant receiver.

Figure 7:
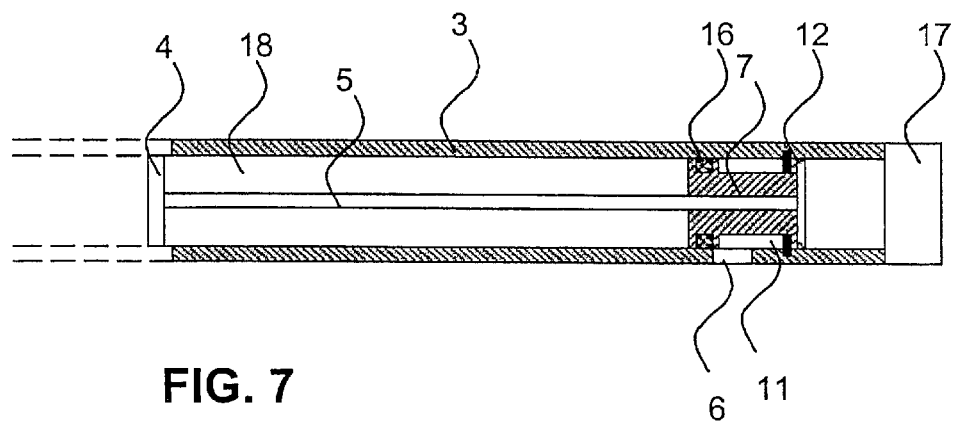
FIG. 7 shows the lubricant discharge device of FIG. 1 in the closed position with the piston in the lower dead-centre position and the closing element inserted in place.

The operation of the lubricant discharge device will be described below with reference to FIGS. 7 to 10. FIG. 7 shows a lubricant discharge device in a recovery state, where the closing element 17 provided at the end of the cylinder 3 and connected to the arm section 5 of the piston 4 is installed in place. It shows that the closing means 7, or the slide 7, is placed in the cylinder 3 such that the lubricant discharge opening 6 is tightly closed. Any lubricant that leaves the bearing housing 1 of the electric motor can flow to a lubricant recovery space 18 of the cylinder 3, i.e. to the side of the piston near the slide 7.

Figure 8:
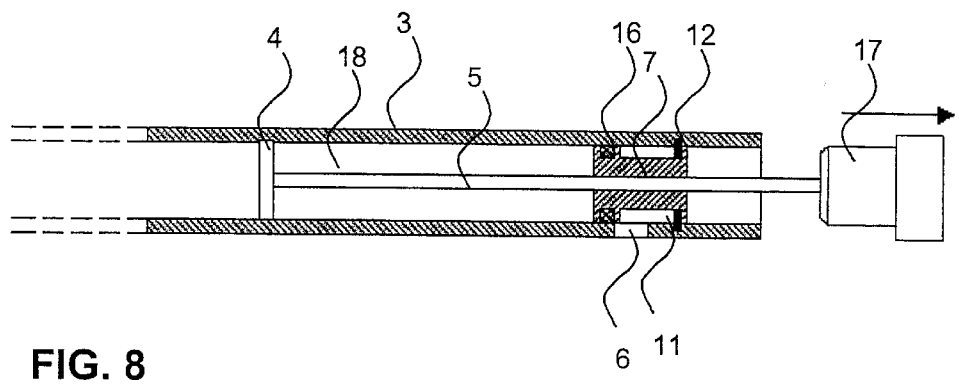
FIG. 8 shows the lubricant discharge device of FIG. 1 where the closing element is disconnected and the piston is being pulled outwards.
Figure 9:
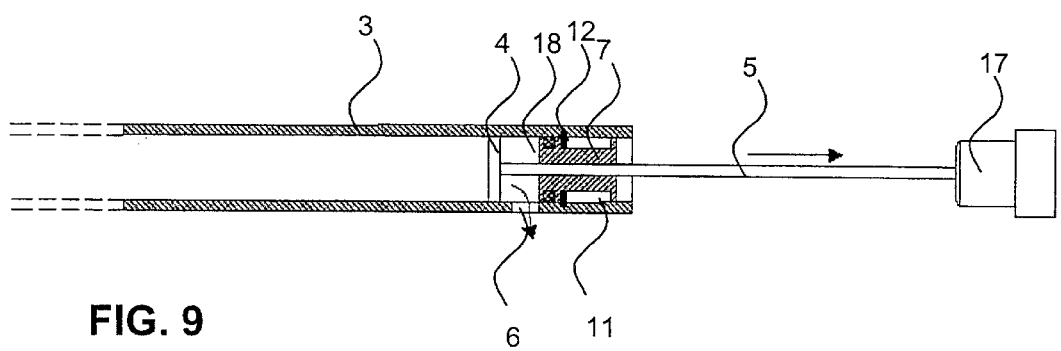
FIG. 9 shows the lubricant discharge device of FIG. 1 with the piston in the upper dead-centre position and the lubricant discharge opening opened by the closing means.

As shown in FIG. 8, when the lubricant gathered in the cylinder 3 is to be removed therefrom, the closing element 17 is unscrewed. When the closing element is pulled outwards, the piston 4 provided inside the cylinder 3 moves and pushes the lubricant gathered in the cylinder 3 ahead of it towards the lubricant discharge opening 6. When the piston 4 has been pulled a required distance outward in order to fill the space between the piston 4 and the closing means 7 with lubricant, the pressure caused by the lubricant starts moving the closing means 7 towards the cylinder 3 end as shown in FIG. 9, and the lubricant discharge opening 6 opens to allow the lubricant to discharge from the cylinder 3 via the opening 6. The stop element 12 restricts the movement of the dosing means 7 to equal the length of the groove 11.

FIG. 10 shows the operation of the device when the closing means 7 is being closed and the dosing element 17 is being reinstalled. The closing means 7 is arranged in the cylinder 3 in a position where the lubricant discharge opening 6 is open. The piston 4 travels towards its lower dead-centre point at the end of the cylinder 3. When the closing element 17 touches the closing means 7, or the slide, the closing element starts pushing the slide 7 inwards in the cylinder 3. When the closing element 17 is finally inserted in place, it pushes the slide 7 to close the lubricant discharge opening 6.

It should be understood that the above description and the related figures are only intended to illustrate the present invention. Therefore the invention is not restricted only to the embodiment disclosed above or defined in the claims, but different variations and modifications of the invention, which are possible within the scope of the inventive idea defined in the appended claims, will be evident to those skilled in the art.

What is claimed is:

1. A lubricant discharge device for discharging lubricant from a bearing housing (1) of an electric motor, comprising
   a tubular element (3) consisting of one or more components (3a, 3b) and arranged at a lubricant discharge opening (2) in the bearing housing (1) of the electric motor, wherein
   a piston (4) is arranged inside the tubular element (3) and it is connected to an arm section (5),
   the tubular element (3) comprising a first end (3d) located substantially at the lubricant discharge opening (2) of the bearing housing (1) in the electric motor, and a second end (3c) that is opposite to the first end and is situated substantially at the outer edge of an end shield of the electric motor, a casing of the tubular element (3) comprising an opening (6) substantially close to the second end (3c) of the tubular element (3), and a closing means (7) being arranged inside the tubular element (3) at the opening (6) to open and close said opening (6).

2. A lubricant discharge device according to claim 1, wherein the outer circumference (9) of the closing means (7) is substantially equal to the inner circumference (8) of the tubular element (3).

3. A lubricant discharge device according to claim 1, wherein the closing means (7) is a slide.

4. A lubricant discharge device according to claim 1, wherein substantially in the middle of its diameter, the closing means (7) comprises a through hole (10) for inserting the arm section (5) of the piston (4), arranged in the longitudinal direction of the closing means (7) and equalling in size the diameter of the arm section (5).

5. A lubricant discharge device according to claim 1, wherein the outer surface of the closing means (7) comprises a groove (11) provided with a stop element (12), and the inner surface of the tubular element (3) comprises a groove (13) arranged to receive said stop element (12), which is arranged to movably fasten the closing means (7) inside the tubular element (3).

6. A lubricant discharge device according to claim 5, wherein the stop element (12) is a locking ring.

7. A lubricant discharge device according to claim 5, wherein the width of the groove (11) provided on the outer surface of the closing means (7) is substantially equal to the diameter of the opening (6) on the outer surface of the casing of the tubular element (3), combined with the thickness of the stop element (12) and the piston (4), the closing means (7) being arranged to open and close the opening (6).

8. A lubricant discharge device according to claim 7, wherein the groove (11) situated on the outer surface of the closing means (7) is provided with a spring element (19), the spring force of which is arranged to automatically close the opening (6) by moving the closing means (7) at the opening (6).

9. A lubricant discharge device according to claim 1, wherein substantially at the edge of the closing means (7) that is near the piston (4), the outer surface of the closing means (7) comprises a second groove (15) provided with a seal (16), which seals the connecting surface between the closing means (7) and the tubular element (3).

10. A lubricant discharge device according to claim 1, wherein the end of the piston (4) arm (7) that is opposite to the piston is provided with a closing element (17) comprising a head (17b) and a thread (17a), the thread (17a) being arranged inside the tubular element (3) and the head (17b) intended to remain outside the end (3c) of the tubular element (3).

11. A lubricant discharge device according to claim 10, wherein when the closing element (17) is inserted in place at the end (3c) of the tubular element (3), the length of the thread (17a) of the closing element (17) is designed to push the closing means (7) so as to close the opening (6) in the casing of the tubular element (3).

* * * * *